US006664316B1

(12) United States Patent
Hywel-Evans

(10) Patent No.: US 6,664,316 B1
(45) Date of Patent: Dec. 16, 2003

(54) POLYESTER RESIN COMPOSITIONS AND USES THEREOF

(75) Inventor: Duncan Hywel-Evans, Cornwall (GB)

(73) Assignee: Fosroc Mining International Limited, Swindon (GB)

( * ) Notice: Subject to any disclaimer, the term of this patent is extended or adjusted under 35 U.S.C. 154(b) by 589 days.

(21) Appl. No.: 09/000,028

(22) PCT Filed: Jul. 31, 1996

(86) PCT No.: PCT/GB96/01848

§ 371 (c)(1),
(2), (4) Date: Jan. 16, 1998

(87) PCT Pub. No.: WO97/06211

PCT Pub. Date: Feb. 20, 1997

(30) Foreign Application Priority Data

Aug. 4, 1995 (GB) .............................................. 9515970

(51) Int. Cl.$^7$ .............................................. C08L 67/00
(52) U.S. Cl. ........................ 523/500; 523/514; 523/521
(58) Field of Search ................ 523/500, 514, 523/521

(56) References Cited

U.S. PATENT DOCUMENTS

| | | | | |
|---|---|---|---|---|
| 3,731,791 A | | 5/1973 | Fourcade et al. | |
| 3,962,162 A | * | 6/1976 | Schmank | 523/516 |
| 4,251,430 A | * | 2/1981 | Skipton | 523/514 |
| 4,280,943 A | * | 7/1981 | Bivens | 523/505 |
| 4,540,726 A | * | 9/1985 | Sugama | 523/505 |
| 4,616,050 A | * | 10/1986 | Simmons | 523/220 |
| 5,202,366 A | * | 4/1993 | Reid | 523/516 |
| 5,212,234 A | * | 5/1993 | Van Gasse | 523/527 |
| 5,342,554 A | * | 8/1994 | McBain | 523/514 |
| 5,385,963 A | * | 1/1995 | McBain | 523/522 |

FOREIGN PATENT DOCUMENTS

| | | |
|---|---|---|
| FR | 1074176 | 10/1954 |
| FR | 1229732 | 9/1960 |
| JP | 52 075 282 | 5/1977 |

* cited by examiner

*Primary Examiner*—Edward J. Cain
(74) *Attorney, Agent, or Firm*—Nixon & Vanderhye P.C.

(57) ABSTRACT

A cross-linkable polyester resin composition for use with a reinforcing element for reinforcing rock and other structures, comprises: (a) from 10 to 45% of a cross-linkable unsaturated polyester resin, (b) from 40 to 90% of a filter and (c) from 1 to 15% of an ethylenically unsaturated monomer copolymerizable with the polyester, the percentages being by weight based on the total weight of (a), (b) and (c), the composition being solid but permitting insertion and rotation of a reinforcing element to cause mixing of the composition with a cross-linking catalyst to form a hard mass. Composition will cold cure when mixed with catalyst preferably the monomer has higher flash point than styrene. Advantage of the solid composition is that it does not need to be enclosed within frangible sheath as in the prior art.

22 Claims, 1 Drawing Sheet

POLYESTER RESIN COMPOSITIONS AND USES THEREOF

CROSS REFERENCE TO RELATED APPLICATION

This is the U.S. national phase of PCT/GB96/01848 filed Jul. 31, 1996.

BACKGROUND AND SUMMARY OF THE INVENTION

This invention relates to crosslinkable polyester resin compositions which are capable of setting to form a hard mass and which are suitable for use with anchoring or reinforcing elements employed in mining and other operations. The invention also provides a system for providing anchoring or structural support in mining and other operations.

It has been the practice to provide roof and wall control in mines with reinforcing elements. These are usually installed by drilling a hole in the roof or other surface and inserting into the hole a settable material and then inserting a reinforcing element, referred to as a bar or rebar. The settable material is allowed to form a hard mass around the reinforcing element. The settable material often comprises a liquid polyester resin. Usually this is mixed with aggregate and enclosed within a tube of frangible material such as paper, glass or plastic. A fluid catalyst component is also provided. Insertion of the reinforcing element causes mixing of the ingredients and initiates the curing reaction which causes the resin to form a hard mass around the reinforcing element.

There have been proposals to employ compositions which can be cured by heat generated by the action of rotating the reinforcing element in the composition. For example, U.K.Patent No 2,007,741A describes a process for positioning a strengthening rod in mine levels in which there is introduced into a long bore made in a wall to be strengthened a thermosetting resin composition and a metal rod of substantially the same length as the bore and the rod is rotated at a speed which causes it to heat up to the hardening temperature of the composition so as to cause the rod to be sealed in the bore by the hardened composition. The resinous compositions are either liquid or semiliquid which can be injected into the borehole or are packaged in a plastic sheath. A later proposal, U.K. Patent No 2,063,888A describes a similar process and liquid resinous composition which comprises as filler, carbon black and defined amounts of chalk and quartz. The carbon black is said to facilitate achieving a better compromise between the reactivity and viscosity of the composition.

The compositions used in the cartridges described in these patent applications and those which are now widely used are either liquid or semi-liquid and need to be contained in a frangible tube in order to retain their shape which is usually that of a long thin and flexible cylinder.

The present invention provides a solution to this problem by the provision of a crosslinkable polyester resin composition which is solid at 20° C. but which is permits insertion of a reinforcing element and rotation thereof to cause mixing of the composition with a catalyst.

According to the present invention there is provided a solid cross linkable composition suitable for use with a reinforcing element for reinforcing rock and other structures, said composition comprising:

(a) from about 10 to 45% of a crosslinkable unsaturated polyester resin, (b) from about 40 to 90% of a filler and (c) from about 1 to 15% of an ethylenically unsaturated monomer copolymerisable with the unsaturated polyester, the percentages being by weight based on the total weight of (a), (b) and (c), the composition being solid but permitting insertion and rotation of a reinforcing element to cause mixing of the composition with a crosslinking catalyst which effects curing of the resin to form a hard mass.

The compositions of the present invention are suitable for use in providing structural support such as reinforcement or providing an anchoring means eg starter bars in concrete, fixings in walls, machinery anchors and the like.

Because the compositions of the invention are solid at 20° C. they can be shaped and will retain their shape without the need for the frangible tube used in the prior art. Preferably the compositions are solid ie retain their shape at temperatures up to 40° C.

The hardness of the solid composition permits the insertion of a reinforcing element and rotation of the reinforcing element which causes mixing of the resin and catalyst. The resin composition and copolymerisable monomer are sufficiently reactive that mixing the crosslinking catalyst with the composition under ambient conditions eg 20° C. will effect the crosslinking of the resin ie the resin is cold cured without the application of heat, although a small amount of heat may be generated by the rotation of the reinforcing element.

DETAILED DESCRIPTION OF THE DRAWINGS

Figure 1:
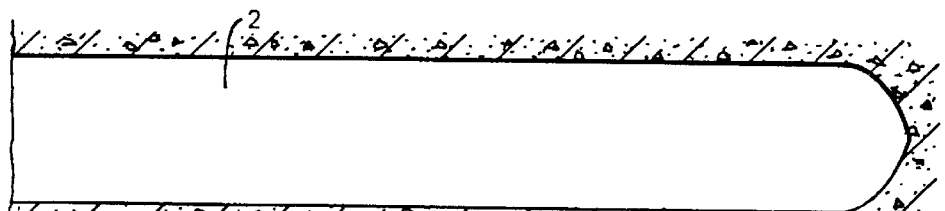
FIGS. 1 to 4 are longitudinal sections showing different stages in the installation of the reinforcing system in a hole drilled in rock.

According to another aspect of the present invention there is provided a shaped solid resin composition suitable for use in the reinforcement of rock and other structures said composition being of generally cylindrical shape to permit insertion in a hole drilled in the rock and comprising (a) from about 10 to about 45% of a crosslinkable polyester resin, (b) from about 40 to about 90% of a filler and (c) from about 1 to about 15% of an unsaturated liquid copolymerisable with the polyester, the percentages being by weight of the total weight of (a), (b) and (c), said composition being solid at ambient temperature but permitting insertion of a reinforcing element and rotation of the element.

The shaped solid resin composition or liquid composition conveniently has a crosslinking catalyst associated therewith. By associated we mean that the catalyst is provided within a separate space (for example in another part of a two part container or as a ready to use combination) from the resin since mixing the resin and catalyst causes the crosslinking action to take place.

The catalyst may conveniently be located in a cavity formed in the shaped solid.

The catalyst is conveniently a free radical initiator for example benzoyl peroxide and is used in amounts from 0.1% to 30% by weight based on the weight of polyester resin, typically 0.2 to 10%. The catalyst may be employed in the form of a paste in which the catalyst in dispersed in a carrier such as dibutyl phthalate.

Preferably an effective amount of an accelerator is included. Preferably the accelerator is incorporated in the polyester resin composition in the course of its preparation ie before the catalyst is mixed with the polyester resin composition.

Preferred accelerators are amines, for example, lower alkyl substituted or alkoxy substituted aromatic amines such as N,N, dimethylaniline, N,N dimethyl paratoluidene and preferably ethoxylated paratoluidene. Amounts of accelerator are typically from 0.01 to 2%, preferably from 0.1 to 1% by weight based on the total weight of the solid resin composition.

By the phrase permit insertion of a reinforcing element we mean that the reinforcing element can be made to penetrate the resin composition employing a conventional bolting machine.

By the term reinforcing element we mean to also include anchoring element unless the context clearly requires otherwise.

The shaped solid compositions are readily transportable and do not necessarily require the conventional polyethylene sheath to contain them as is the case with liquid and semiliquid compositions of the prior art. In some instances it may be convenient to employ a barrier means to stop the shaped solid compositions conveniently referred to as cartridges sticking together, for example, a sheet or powder applied to the surface.

Preferably the hardness of the polyester resin composition is in the range 0 to 4 according to the following Brinell hardness test which gives a number indicative of the hardness of the material, the higher the number then the greater the hardness. In the test a ball bearing of diameter 1 (one) inch was employed and the standard procedure of the Brinell hardness test followed. This is a well known test and is described for example in Machinery's Handbook 21st Edition at pages 2127 and 2128.

The hardness number is given by taking the load on the indenting tool (the steel ball) in kilograms and dividing by the surface area of the indentation in sq mm.

Preferred amounts of polyester resin in the composition are from about 10 to about 45% more preferably, from 15 to 35% by weight based on the weight of the polyester, monomer and filler. The polyester resin may be provided as a high molecular weight component eg molecular weight from 2500 to 10,000 and a low molecular weigh component eg molecular weight from 500 to 2000.

The relative amounts of high molecular weight resin to low molecular weight resin can be from 25:1 to 1:5, preferably from 10:1 to 1:2 by weight.

Preferred amounts of filler in the resin containing component are from 40% to 90% more preferably from 50 to 85%.

The filler will generally be inorganic but some organic fillers may be used eg polystyrene. The filler may be provided as a coarse component eg as granite chips, for example, in amount 15 to 30% and a fine component eg as sand in an amount from 30 to 55%.

The polyester resin may be meltable by rotation of the bar in the composition. This however is not essential provided the polyester resin becomes sufficiently fluid to permit adequate mixing of the resin and the crosslinking catalyst.

Preferably the polyester resins have a higher degree of unsaturation than those which have been previously used.

In the case of polyesters obtained from mixtures of maleic and phthalic acids or anhydrides, the higher degree of unsaturation can conveniently be obtained by increasing the ratio of maleic to phthalic in the reaction mixture. In previously used polyester resin compositions this ratio has not exceeded 2:1. In the present invention this ratio is preferably from 3:1 to 8:1.

In order to provide polyester resins having the preferred properties for use in the present invention certain novel polyester resins compositions have been developed.

Thus, according to a further aspect of the present invention there is provided a crosslinkable polyester resin composition which is softenable to facilitate mixing with a crosslinking catalyst to effect crosslinking said composition having a molecular weight in the range from 2500 to 5500 comprising:

a polyester which is the reaction product of maleic and phthalic acids or anhydrides with propylene and ethylene glycols in which the molar ratio of maleic anhydride to phthalic anhydride is in the range from 3:1 to 8:1 and the molar ratio of ethylene to propylene glycol is in the range from 1:1 to 5:1.

A further novel polyester resin composition is provided having a molecular weight in the range from 800 to 2000 and which is the reaction product of maleic and phthalic acids or anhydrides with propylene and ethylene glycols in which the molar ratio of maleic to phthalic is in the range from 2:1 to 8:1, preferably 3:1 to 5:1 and the molar ratio of ethylene glycol to propylene glycol is in the range from 1:1 to 5:1 preferably 2:1 to 4:1.

The reinforcing element may be one of those currently used with reinforcing cartridges, which are sometimes referred to as a bar or rebar.

To assist penetration, the reinforcing element may be provided with a sharpened end for example by cutting. Alternatively or in addition, the cartridge may be provided with means for increasing the heat generated by rotation of the reinforcing element, for example, two or more spaced apart washers. Preferably the washers are arranged to engage the element and be rotated when the element is rotated to facilitate local heating by friction.

It is a requirement of the ethylenically unsaturated monomer that it is copolymerisable with the polyester and results in a solid composition in which an anchoring element will be securely held. The monomer can be solid or liquid. Suitable monomers are those which are known in the art such as styrene although it is preferred to use compounds having a higher flash point than styrene preferably above 50° C. more preferably above 75° C.

Preferred such monomers include esters of acrylic and methacrylic acids, for example alkyl, preferably lower alkyl, esters of acrylic and methacrylic acids. A particularly preferred liquid is 2-hydroxyethyl methacrylate.

The amount of styrene present in the compositions is preferably less than 3% more preferably less than 2% most preferably less than 1% based on the total weight of polyester, filler and unsaturated liquid.

Cure modifiers such as vinyl substituted aromatic compounds eg divinyl benzene, and acrylate esters of glycols such as ethylene glycol dimethacrylate, trimethyl propane trimethacrylate and triethylene glycol dimethacrylate (TEGDMA) may also be present as these assist the rate of set.

According to another aspect of the invention there is provided a method of providing structural support which method comprises inserting into a borehole a shaped solid resin composition as hereinbefore defined including an effective amount of a crosslinking catalyst and then bringing a reinforcing element into contact with the shaped solid and rotating the element to cause the element to penetrate the shaped solid and cause same to soften and cause mixing of the resin and crosslinking catalyst and effect crosslinking of the polyester resin and form a hard mass securing the reinforcing element.

The invention is of particular application in mining but also is applicable to tunnelling, quarrying and other forms of earth or rock excavation and to reinforcing concrete and other structures such as buildings.

The invention is illustrated by the following examples.

EXAMPLE 1

A composition was prepared containing the following components:

| | |
|---|---|
| High molecular weight polyester resin[1] (to assist shape retention during storage) | 22.33% |
| Low molecular weight polyester resin[2] (to increase reactivity of the polymer) | 4.47% |
| crystalline polystyrene (cold and hot flow modifier by increasing the average molecular weight of the whole) | 2.23% |
| 1.4 naphthaquinone (to increase storage life) | 0.22% |
| 2-hydroxyethyl methacrylate (bulk copolymer to react with polyester components) | 3.13% |
| divinyl benzene (cure modifier for polyester/2-hydroxyethyl methacrylate system) | 0.28% |
| ethoxylated para toluidene (low toxicity amine accelerator) | 0.36% |
| 3700/001 granite chips (coarse filler) | 22.33% |
| 0809/001 sand (filler) | 44.63% |

The percentages are by weight based on the weight of the total composition.

1. A commercially available high molecular weight ie about 4000 MWA isophthalic resin designated 6404-N-1 from Dutch State Mines.
2. Was a polyester having molecular weight of about 1200 prepared from maleic anhydride and phthalic anhydride in a molar ratio of 3:1 amd ethylene glycol and propylene glycol in a molar ratio of 2.5:1.

The esterification was carried out at 137° C. followed by heating to 190° C. to remove water as an azeotrope.

The high molecular weight polyester was heated in an oven to about 120° C. and, when molten, the low molecular weight polyester and crystalline polystyrene were added and reheated until molten. Under fume extraction the 1,4naphthaquinone was added and stirred until uniformly distributed. The 2-hydroxyethyl methacrylate, divinyl benzene and ethoxylated toluidene were blended together and added without heating, and stirred until the mixture was homogeneous. This product was then mixed with a mixture of the granite chips and sand which had been preheated in an oven to about 120° C. and stirred until the fillers were evenly distributed. The mixture was then cast into a cylindrical shape with a space left for the catalyst. On cooling the mixture solidified with the space forming a cavity for the catalyst (benzoyl peroxide as a 50% paste in dibutyl phthalate in amount to provide 3% of benzoyl peroxide based on the weight of the polyester resin) which was added when the mixture had cooled.

The product is suitable for use in a cartridge for rock reinforcement and the composition permits insertion of a reinforcing element and on rotation of the element, the resin softens and becomes sufficiently fluid to cause mixing with the cross linking catalyst and effect curing of the resin.

EXAMPLE 2

A composition was prepared containing the following components:

400 parts of high molecular weight polyester resin (6406-N-1 from DSM)
80 parts of low molecular weight polyester resin
40 parts of crystalline polystyrene
0.4 parts of 1:4 naphthaquinone
41 parts of 2-hydroxyethyl methacrylate
10 parts of ethylene glycol dimethacrylate
10 parts of trimethyl propane trimethacrylate
3 parts of ethoxylated para toluidene
400 parts of 3700/001 granite chips
800 parts of sand The parts are by weight. The mixing of the components was carried out as described in Example 1 and gave a product suitable for use in a cartridge. In addition to being free of benzene it is an advantage of the above composition is that it is also free of divinyl benzene.

The catalyst(as a 50% dispersion in dibutyl phthalate in amount to provide 3% by weight of benzoyl peroxide based on the weight of polyester resin) and resin were mixed and the set material and reinforcing element tested according to ASTM f 432 for pulling strength.

It was found that the strength was 25 tons for a 6 inch bond length. This is substantially better than is achieved with currently available reinforcing systems.

The compositions of the Examples had the following advantages:

the compositions were solid and can be formed into cylindrical reinforcing cartridges without the need for a frangible tube as used in the prior art the formed cartridges are transportable whilst retaining their shape, the compositions when mixed with the catalyst are cold curing, that is they can be crosslinked without the application of heat the avoidance of styrene which is inflammable and toxic presents significant environmental benefits the use of a copolymerisable monomer which is less volatile than styrene improves the shelf life.

Referring to the drawings FIG. 1 shows the first step in the installation of the reinforcing system of the invention and shows a longitudinal section of a hole 2 drilled in rock, which may, for example, be the roof in a mine.

Figure 2:
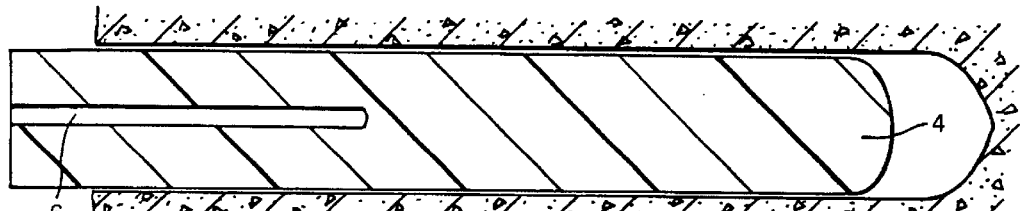

FIG. 2 shows the next stage in the installation of the reinforcing system and shows a polyester resin containing composition which has been cast into the shape of a cylinder 4 partially inserted into the hole 2. The cylinder 4 has a small drilled hole 6 to provide a cavity for a cross linking catalyst.

Figure 3:
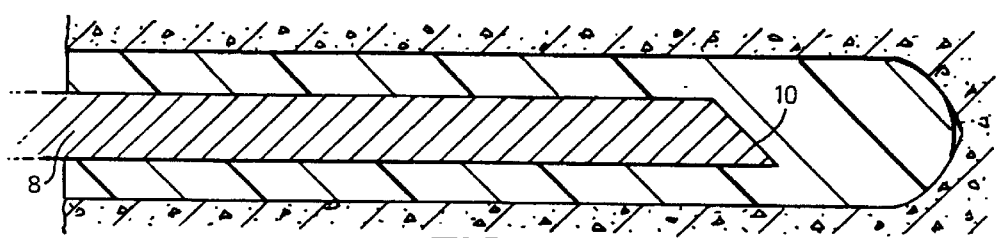

FIG. 3 shows a further stage where a reinforcing element 8 has been inserted into the polyester resin cylinder 4. The reinforcing element 8 has a sharpened end 10 to facilitate penetration of the polyester. Rotation of the reinforcing element 8 effects mixing of the resin and crosslinking catalyst and effects curing of the resin around the reinforcing element 8 to anchor it in place.

Figure 4:
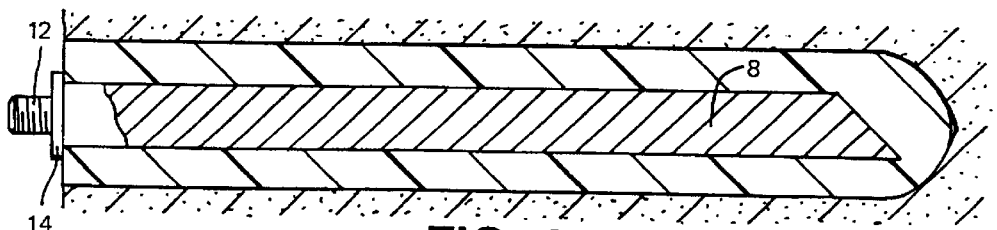

FIG. 4 shows the anchored reinforcing element 8 which may be secured by a screw threaded nut 12 and washer 14 at its outward end.

What is claimed is:

1. A cross linkable polyester resin composition suitable for use with a reinforcing element for reinforcing rock and other structures, said composition comprising:

(a) from 10 to 45% of a crosslinkable unsaturated polyester resin, (b) from 40 to 90% of a filler and (c) from 1 to 15% of an ethylenically unsaturated monomer copolymerisable with the polyester, the percentages being by weight based on the total weight of (a), (b) and (c), the composition being solid but permitting insertion and rotation of a reinforcing element to cause mixing of the composition with a crosslinking catalyst to cold cure to form a hard mass.

2. A composition as claimed in claim 1 wherein the composition has associated therewith an effective amount of a crosslinking catalyst.

3. A composition as claimed in claim 2 wherein the unsaturated monomer is an ester of acrylic or methacrylic acid.

4. A composition as recited in claim 2 having a Brinnel hardness between 0–4.

5. A composition as claimed in claim 1, wherein the amount of ethylenically unsaturated monomer is from 2 to 10% by weight based on the total weight of (a), (b) and (c).

6. A composition as claimed in claim 5 wherein an effective amount of an accelerator is included.

7. A composition as claimed in claim 6 wherein the polyester resin comprises a high molecular weight component having a molecular weight average in the range from 2500 to 10,000 in an amount from 10 to 30% and a low molecular weight component having a molecular weight average from 500 to 2000 in an amount from 2 to 10% the percent being by weight based on the total weight of polyester, monomer and filler.

8. A composition as claimed in claim 1 wherein the unsaturated monomer is an ester of acrylic or methacrylic acid.

9. A composition as claimed in claim 8 wherein an effective amount of an accelerator is included.

10. A composition as claimed in claim 1 wherein an effective amount of a promoter is included.

11. A composition as claimed in claim 10 wherein the promoter is an amine.

12. A composition as claimed in any one of claims 1, 2, 5, 8, 10 or 11 wherein the polyester resin comprises a high molecular weight component of molecular weight in the range from 2500 to 10,000 in an amount from 10 to 30% and a low molecular weight component of molecular weight from 500 to 2000 in an amount from 2 to 10% the % being by weight based on the total weight of polyester, monomer and filler.

13. A composition as claimed in claim 12 wherein the high molecular weight and low molecular weight components are obtained by the reaction between maleic and phthalic acids or their anhydrides with ethylene and propylene glycols.

14. A shaped article suitable for use in the reinforcement of rock and other structures or providing an anchor therein said article being of an elongate shape to permit insertion into a hole drilled in the rock, and comprising a cold cure cross linkable polyester resin composition which comprises:
 (a) from 10 to 45% of a crosslinkable unsaturated monomer copolymerisable with the polyester wherein; the percentages are by weight of the total weight of (a), (b) and (c); and
  wherein said composition is solid at 20° C. and has a hardness that permits insertion of a reinforcing or anchoring element and rotation of the element in the composition.

15. A shaped article as recited in claim 14 devoid of a frangible tube covering said article.

16. A shaped solid polyester resin composition suitable for use in the reinforcement of rock and other structures or providing an anchoring means therein said composition being of an elongate shape eg cylindrical to permit insertion in a hole drilled in the rock and comprising
 (a) from 10 to 45% of a crosslinkable unsaturated polyester resin,
 (b) from 40 to 90% of a filler and
 (c) from 1 to 15% of an ethylenically unsaturated monomer copolymerisable with the polyester, the percentages being by weight of the total weight of (a), (b) and (c), said composition being solid at 20° C. and having a hardness that permits insertion of a reinforcing or anchoring element and rotation of the element in the composition.

17. A shaped solid resin composition as claimed in claim 16 having an effective amount of a crosslinking catalyst associated therewith.

18. A shaped solid resin composition as claimed in claim 17 wherein the solid composition has a cavity containing the crosslinking catalyst.

19. A method of providing a support or anchor in a borehole, comprising
 (a) inserting into the borehole a shaped article solid at 20 degrees C. and comprising a cross linkable polyester resin composition of 10–45% by weight crosslinkable unsaturated polyester resin, 1–15% by weight of an ethylenically unsaturated monomer copolymerizable with the polyester resin, 40–90% by weight filler, and an effective amount of a crosslinking catalyst, and without a frangible tube covering the solid shaped article, so that the solid shaped article stays in the borehole;
 (b) bringing a reinforcing or anchoring element into contact with the shaped solid;
 (c) moving the reinforcing or anchoring element with respect to the shaped solid to cause the element to penetrate the shaped solid, and to cause mixing of the resin and catalyst; and
 (d) mixing of the resin and catalyst effecting cold cure crosslinking of the resin and catalyst and thereby causing the solid to harden into a hard mass which secures the reinforcing or anchoring element in the hard mass.

20. A method as recited in claim 19 wherein the shaped solid has a substantially cylindrical shape and has a central hole therein for the reinforcing or anchoring element, which has a sharpened end; and wherein (b) is practiced by moving the sharpened end of the reinforcing or anchoring element into the central hole.

21. A method as recited in claim 20 wherein (c) is practiced by causing the reinforcing or anchoring element to move linearly with respect to the shaped solid to penetrate the shaped solid, and by rotating the reinforcing or anchoring element with respect to the shaped solid.

22. A method as recited in claim 19 wherein (a)–(d) are practiced in a borehole drilled into the roof of a mine, and wherein (b)–(d) are practiced using a roofing bolt as the reinforcing or anchoring element.

* * * * *